(12) United States Patent
Po et al.

(10) Patent No.: US 6,911,279 B2
(45) Date of Patent: Jun. 28, 2005

(54) BATTERY HOLDER FOR COIN CELL

(75) Inventors: Li-Ming Po, Tu-chen (TW); GwouJong Tseng, Tu-Chen (TW); Yuh Huey Kang, Tu-Chen (TW)

(73) Assignee: Hon Hai Precision Ind. Co. Ltd., Taipei (TW)

( * ) Notice: Subject to any disclaimer, the term of this patent is extended or adjusted under 35 U.S.C. 154(b) by 64 days.

(21) Appl. No.: 10/325,405

(22) Filed: Dec. 19, 2002

(65) Prior Publication Data

US 2004/0106035 A1 Jun. 3, 2004

(30) Foreign Application Priority Data

Nov. 29, 2002 (TW) .......................................... 91219307

(51) Int. Cl.$^7$ ............................................... H01M 2/10
(52) U.S. Cl. ........................... 429/96; 429/97; 429/100; 429/1
(58) Field of Search ............................ 429/100, 97, 96, 429/186, 162, 163, 176, 178, 9, 1; 439/500, 627, 625, 754, 756

(56) References Cited

U.S. PATENT DOCUMENTS 4,487,820 A * 12/1984 Engelstein et al. ......... 429/100
5,980,309 A * 11/1999 Frantz et al. ............... 439/500

* cited by examiner

Primary Examiner—Raymond Alejandro
(74) Attorney, Agent, or Firm—Wei Te Chung

(57) ABSTRACT

A battery holder (1) for receiving a coin cell (6) includes an insulative housing (2) and a first and a second contacts (4, 5) received in the insulative housing. The coin cell includes a positive pole (61) and a negative pole (62) with a smaller diameter than the positive pole thereby forming an annular receiving room (63) around the positive pole. The insulative housing includes a base plate (21), a bulge (22) and a number of chimbs (24) extending upwardly from the base plate and a protrusion (34) at a junction between the base plate and the bulge. The protrusion is mating with the receiving room around the positive pole for preventing the coin cell from reverse insertion.

8 Claims, 5 Drawing Sheets

BATTERY HOLDER FOR COIN CELL

BACKGROUND OF THE INVENTION

1. Field of the Invention

The present invention relates to a battery holder, and particularly to a battery holder for a coin cell.

2. Description of Prior Art

Taiwan Pat. No. 357937 discloses a battery holder for coin cells. The battery holder includes an insulative housing and a pair of contacts assembled to the insulative housing. The insulative housing includes a base plate for receiving a coin cell and a plurality of sidewalls extending upwardly from outer edges of the base plate. One of the contacts connects with the negative pole of the coin cell. Another contact is used to connecting with a positive pole of the coin cell. However, the battery holder have no means to prevent the coin cell from reverse insertion.

U.S. Pat. No. 5,980,309 discloses another battery holder for a coin cell. The battery holder is similar to the one described in Taiwan Pat. No. 357937 and also have no means to prevent the coin cell from a reverse insertion.

Hence, an improved battery holder adapted for a coin cell is required to overcome the disadvantages of the conventional battery holder.

SUMMARY OF THE INVENTION

Accordingly, an object of the present invention is to provide a battery holder for a coin cell with means for preventing reverse insertion of the coin cell.

In order to achieve the objects above-mentioned, a battery holder of the present invention is used for receiving a coin cell. The coin cell includes a positive pole and a negative pole whose diameter is smaller than that of the positive pole thereby forming an annular receiving room around the positive pole. The battery holder includes an insulative housing and a first and second contacts assembled to the insulative housing. The insulative housing includes a base plate, a bulge extending upwardly from the base plate, a plurality of chimbs extending upwardly from the base plate and a protrusion at junction between the base plate and the bulge and/or between the base plate and at least one chimb for engaging with the receiving room around the positive pole. The bulge and the chimb together form a receiving cavity for receiving the coin cell. The insulative housing further defines a passageway through the base plate and a hole through the bulge. The first and second contacts each comprise a retention arm respectively received in the hole and the passageway and a mating arm substantially perpendicular to the mating arm. The mating arms extend to the receiving cavity and face to each other.

Other objects, advantages and novel features of the invention will become more apparent from the following detailed description when taken in conjunction with the accompanying drawings.

DETAILED DESCRIPTION OF THE INVENTION

Figure 1:
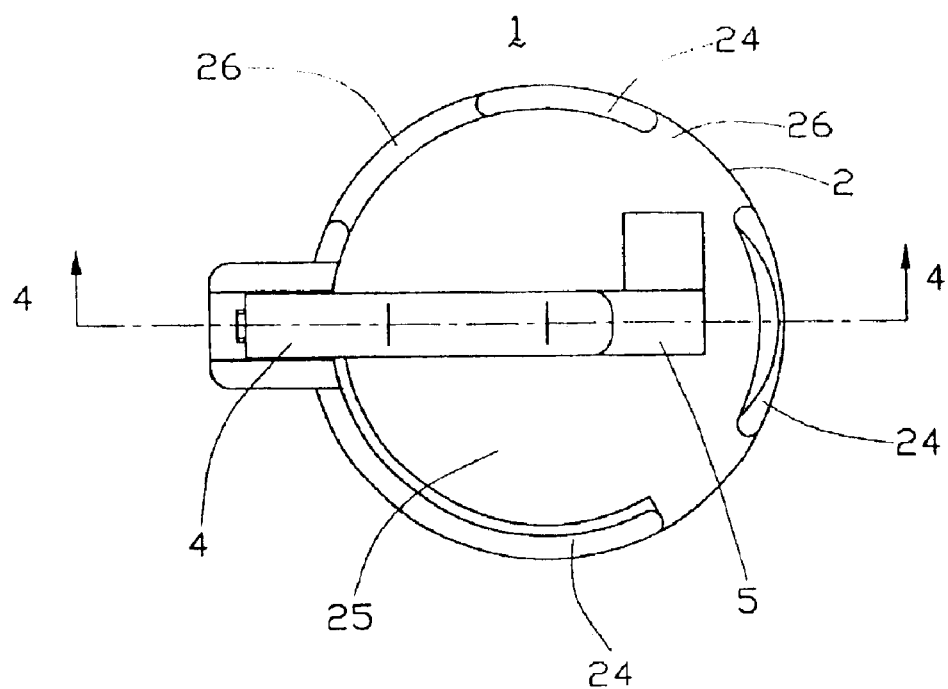
FIG. 1 is a top view of a battery holder in accordance with the present invention.
Figure 2:
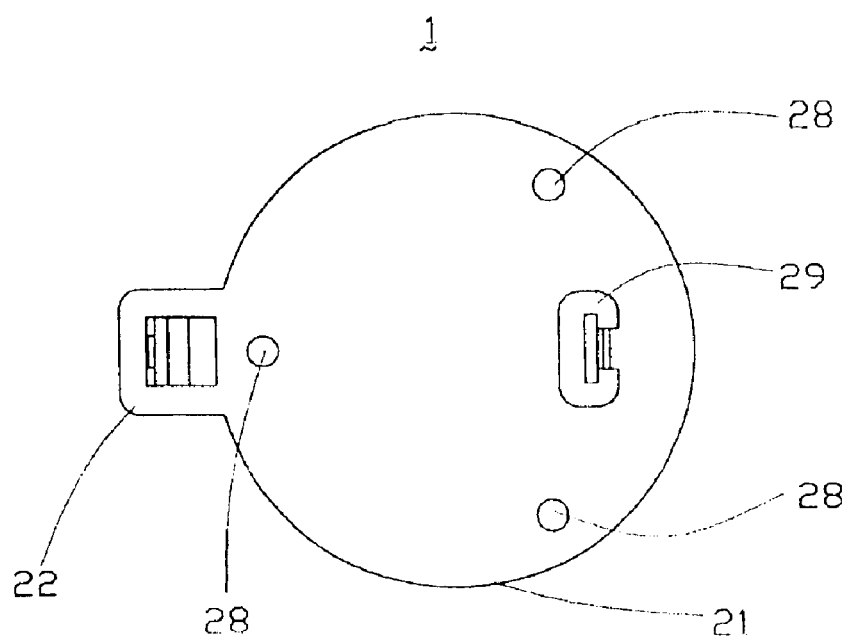
FIG. 2 is a bottom view of the battery holder in FIG. 1.
Figure 3:
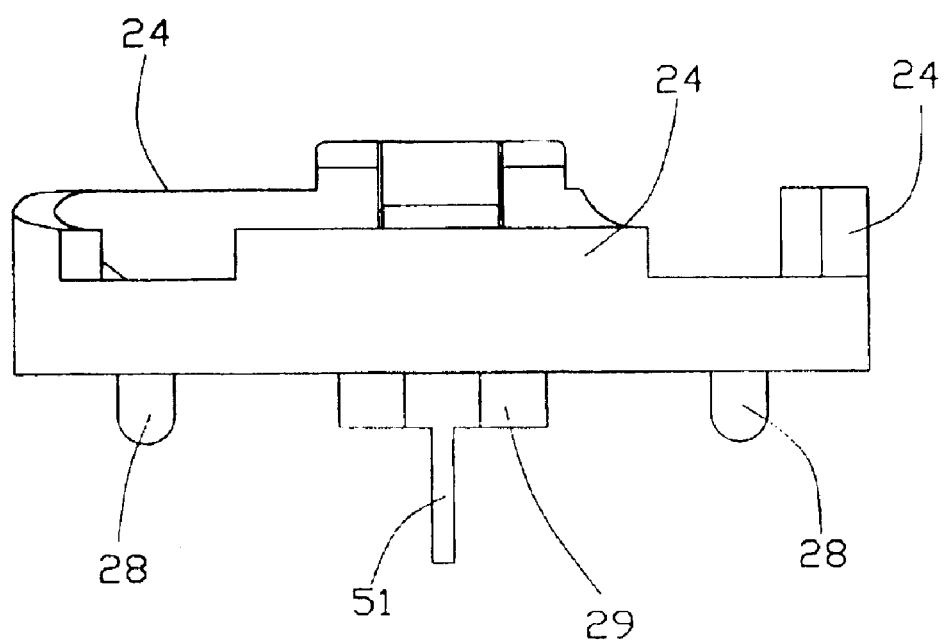
FIG. 3 is an enlarged right view of the battery holder in FIG. 1.
Figure 4:
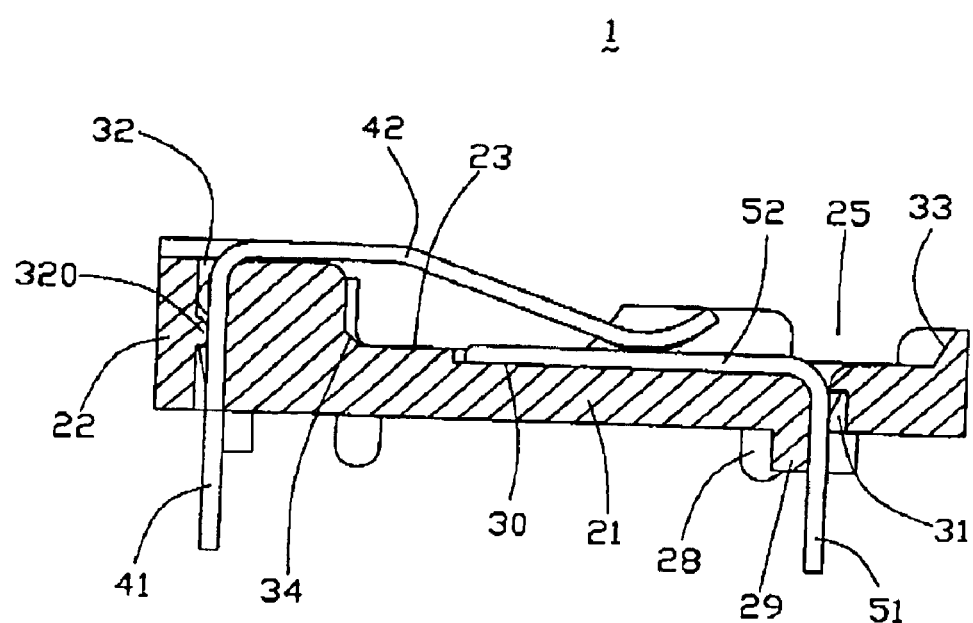
FIG. 4 is an enlarged cross-section view taken along line 4—4 of FIG. 1.

Reference will now be made to the drawing figures to describe the present invention in detail.

Referring to FIGS. 1–4, a battery holder 1 in accordance with the present invention includes an insulative housing 2 and a first and a second contacts 4, 5 assembled to the insulative housing 2.

The insulative housing 2 includes a substantially coin-shaped base plate 21, a bulge 22 extending upwardly from an outer edge of the base plate 21 and a plurality of chimbs 24 extending upwardly from a top surface 23 of the base plate 21. The bulge 22 and the chimbs 24 together define a receiving cavity 25 for receiving a coin cell 6. It should be noted that the bulge 22 is a little higher than the chimbs 24 and one of the chimbs 24 faces to the bulge 22. A void 26 is left between the chimbs 24 and between the chimb 24 and the bulge 22 for convenient insertion of the coin cell 6 into the receiving cavity 25 and withdrawal of the coin cell 6 from the battery holder 1. The base plate 21 on a bottom surface thereof forms three standoff devices 28 extending downwardly and a projection 29 opposite to the bulge 22. The standoff devices 28 and the projection 29 are adapted for blocking up the battery holder 1 when the battery holder 1 is placed on a printed circuit board (not shown). The base plate 21 on the top surface 23 thereof defines a recess 30 extending from the projection 29 toward the bulge 22. The insulative housing 2 defines a passageway 31 through the base plate 21 and the projection 29. It should be noted that the passageway 31 is communicating with the recess 30. The bulge 22 defines a through hole 32 extending between the top and the bottom surfaces 23, 27 thereof. A block 320 is defined in an inner wall of the through hole 32 for interferentially securing the first contact 4 in the through hole 32. The chimb 24 opposite to the bulge 22 defines an inclined inner surface 33. In addition, a protrusion 34 is formed at a junction between the bulge 22 and the base plate 21 and junctions between the base plate 21 and the chimbs 24.

The first contact 4 includes a retention arm 41 and a mating arm 42 substantially perpendicular to the retention arm 41. The retention arm 41 is retained in the through hole 32 of the bulge 22 with a lower portion thereof extending beyond the base plate 21 for soldering on the printed circuit board. The mating arm 42 extends horizontally a distance toward the chimb 24 opposite to the bulge 22 and then bending downwardly before extending upwardly. Similarly, the second contact 5 includes a retention arm 51 and a mating arm 52 substantially perpendicular to the retention arm 51. The retention arm 51 is received in the passageway 31 of the base plate 21 with a lower portion extending beyond the base plate 21 for soldering on the printed circuit board. The mating arm 52 is received in the recess 30 of the base plate 21 with a top surface facing to a bottom surface of the mating arm 42 of the first contact 4.

Figure 5:
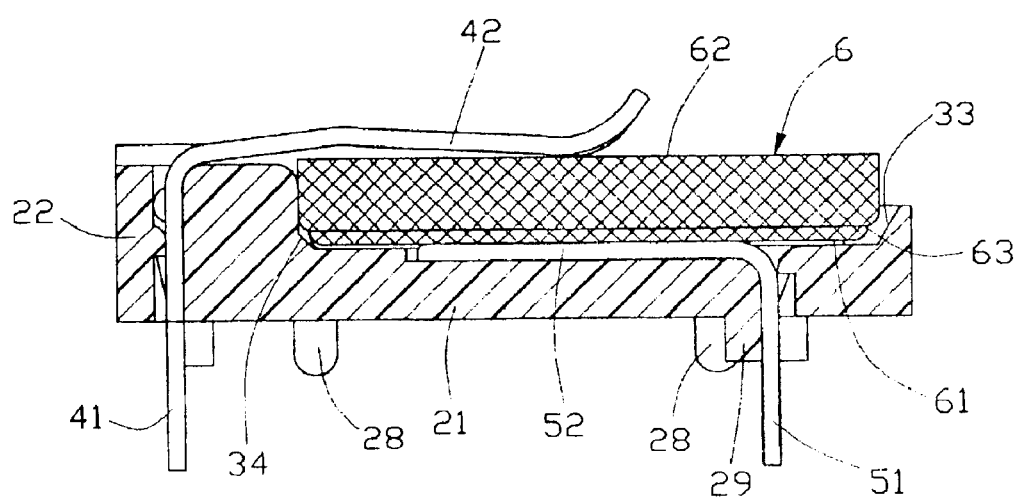
FIG. 5 is a cross-section view showing that a coin cell is inserted into the battery holder with a positive pole facing downwardly.
Figure 6:
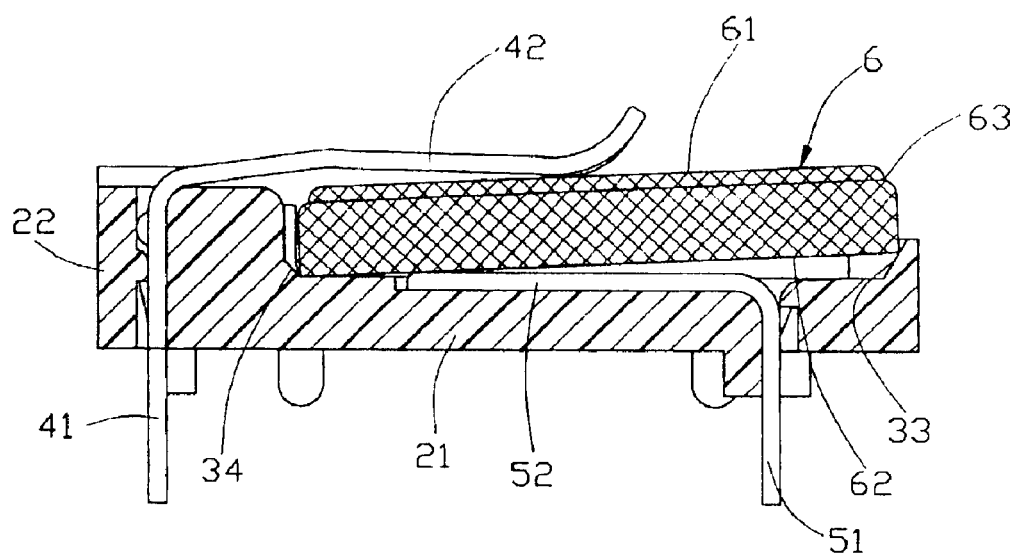
FIGS. 6 and 7 are cross-sectional views showing that a coin cell is inserted into the battery holder with a negative pole facing upwardly.
Figure 7:
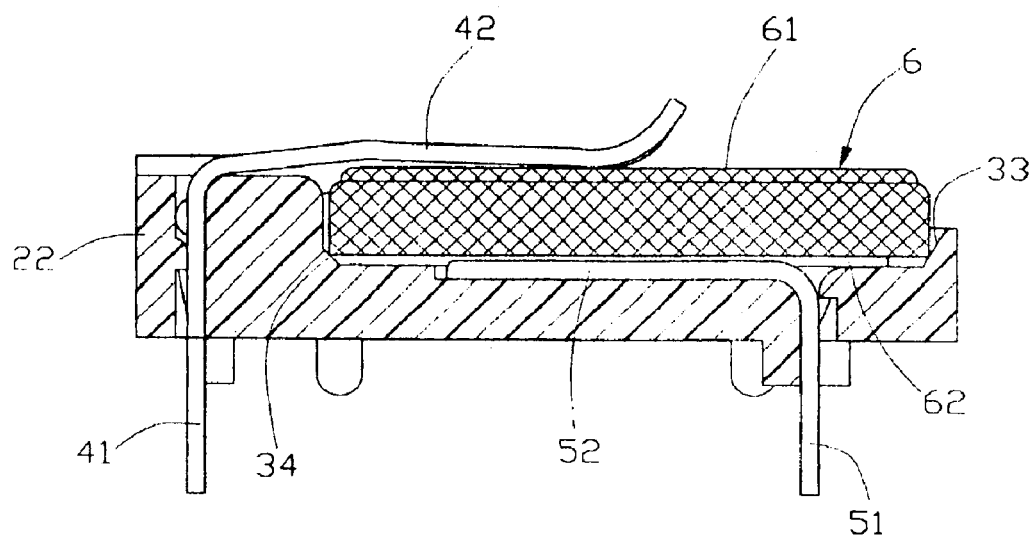

Referring to FIGS. 5–7, the coin cell 6 includes a positive pole 61 and a negative pole 62 opposite to the positive pole 61. It should be noted that the diameter of the positive pole 61 is smaller than that of the negative pole 62, such that an annular receiving room 63 is defined on an outer edge of the positive pole 61. The diameter of the negative pole 62 is substantially equal to or a little smaller than that of the receiving cavity 25. When the coin cell 6 is placed into the receiving cavity 25 of the insulative housing 2 with the positive pole 61 facing downwardly, the protrusion 34 of the insulative housing 2 is received in the annular receiving room 63. Therefore, the coin cell 6 can be fully received in the receiving cavity 25 with the positive pole 61 electrically connecting with the mating arm 52 of the second contact 5 and the mating arm 42 of the first contact 4 pressing against the negative pole 62. While the coin cell 6 is placed into the receiving cavity 25 of the insulative housing 2 with the negative pole 62 facing downwardly, an outer edge of the negative pole 62 abuts against the inclined inner surface 33 of the chimb 24 and/or the protrusion 34 of the bulge 22 such that the negative pole 62 is blocked up by the inclined surface 33 and/or the protrusion 34. Therefore, the negative pole 62 cannot electrically connect with the mating arm 52 of the second contact 5.

The battery holder 1 provides the protrusion 34 at the junction between the base plate 21 and the bulge 22 and the junction between the base plate 21 and the chimb 24 in according to the receiving room 63 around the negative pole 62 whereby the coin cell 6 is prevented from reversely inserting into the receiving cavity 25 of the insulative housing 2. In addition, the battery holder 1 has a simple structure for preventing the coin cell 6 from reverse insertion.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery holder for receiving a coin cell with a positive pole and a negative pole whose diameter is smaller than that of the positive pole thereby forming an annular receiving room around the positive pole, comprising:

an insulative housing comprising a base plate, a bulge extending upwardly from the base plate, a plurality of chimbs extending upwardly from the base plate and a protrusion at junctions between the base plate and the bulge and between the base plate and at least one of the chimbs, one chimb opposite to the bulge defining an inclined inner surface, the bulge and the chimb together forming a receiving cavity for receiving a coil cell, the insulative housing further defining a passageway through the base plate and a hole through the bulge, the hole further defining a block in an inner wall thereof; and a first and a second contacts each comprising a mating arm and a retention arm substantially perpendicular to the mating arm; wherein the protrusion and the incline inner surface are configured to be received in the receiving room around the positive pole, the retention arms of the first and the second contacts are respectively received in the hole of the bulge and the passageway of the base plate, with the retention arm of the first contact interferentially contacting the block, and the mating arms extend to the receiving cavity and face to each other.

2. The battery holder as described in claim 1, wherein the bulge extends beyond an outer edge of the base plate.

3. The battery holder as described in claim 1, wherein the base plate defines a recess for receiving a portion of the mating arm of the second contact.

4. The battery holder as described in claim 1, wherein the base plate forms a plurality of stand-off device on a bottom surface thereof adapted for engaging with a printed circuit board on which the battery holder is mounted.

5. A battery holder assembly comprising:

an insulative housing including a base plate with a peripheral wall extending upward therefrom to commonly define a disc-shaped space above said base plate;

a first terminal including a first solder section located around a bottom face of the base plate, and a first contact portion located upon a top face of the base plate;

a second terminal including a second solder section located around the bottom face of the base plate, and a second contact portion extending above, with a distance, said top face of the base plate with a distal end deflected toward the first contact portion;

a downwardly converged structure formed around junction between the base plate and the peripheral wall; and a disc-shaped battery including a thicker negative pole and a thinner positive pole stacked with each other; wherein said downwardly converged structure is configured to comply with shape transition between the negative pole and the positive pole when said battery is installed into the housing correctly.

6. The assembly as described in claim 5, wherein said peripheral wall is not completely circumferentially continuously formed.

7. The battery holder for receiving therein a disc-shaped battery including a thicker negative pole and a thinner positive pole stacked with each other and forming a shape transition area therebetween, comprising:

an insulative housing including a base plate with a peripheral wall extending upward therefrom to commonly define a disc-shaped space above said base plate;

a first terminal including a first solder section located around a bottom face of the base plate, and a first contact portion located upon a top face of the base plate;

a second terminal including a second solder section located around the bottom face of the base plate, and a second contact portion extending above, with a distance, said top face of the base plate with a distal end deflected toward the first contact portion;

a downwardly converged structure formed around junction between the base plate and the peripheral wall, for compliance with the shape transition area of said battery so as to prevent upside-down installation of the battery into the housing.

8. The holder as described in claim 7, wherein said peripheral wall is not completely circumferentially continuously formed.

* * * * *